(12) United States Patent
Tsuchida et al.

(10) Patent No.: US 9,070,201 B2
(45) Date of Patent: Jun. 30, 2015

(54) IMAGE PROCESSING APPARATUS

(71) Applicant: OLYMPUS CORPORATION, Tokyo (JP)

(72) Inventors: Ryusuke Tsuchida, Tokyo (JP); Akira Ueno, Tokyo (JP); Keisuke Nakazono, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 138 days.

(21) Appl. No.: 14/034,156

(22) Filed: Sep. 23, 2013

(65) Prior Publication Data

US 2014/0099046 A1   Apr. 10, 2014

(30) Foreign Application Priority Data

Oct. 4, 2012   (JP) .................................. 2012-222120

(51) Int. Cl.
  *G06T 1/20*   (2006.01)
(52) U.S. Cl.
  CPC ........................................ *G06T 1/20* (2013.01)
(58) Field of Classification Search
  None
  See application file for complete search history.

(56) References Cited

U.S. PATENT DOCUMENTS

| | | | | |
|---|---|---|---|---|
| 5,457,780 | A * | 10/1995 | Shaw et al. | 345/502 |
| 5,499,110 | A * | 3/1996 | Hosogai | 358/450 |
| 2004/0196290 | A1 * | 10/2004 | Satoh | 345/505 |
| 2008/0313439 | A1 * | 12/2008 | Suzuki | 712/225 |
| 2010/0241826 | A1 * | 9/2010 | Hara et al. | 712/29 |
| 2012/0203942 | A1 * | 8/2012 | Yonemoto et al. | 710/53 |
| 2014/0099046 | A1 * | 4/2014 | Tsuchida et al. | 382/305 |
| 2014/0253598 | A1 * | 9/2014 | Song et al. | 345/660 |
| 2014/0347359 | A1 * | 11/2014 | Gruen et al. | 345/426 |

FOREIGN PATENT DOCUMENTS

JP   2010-176606 A   8/2010

* cited by examiner

*Primary Examiner* — Sean Motsinger (74) *Attorney, Agent, or Firm* — Westerman, Hattori, Daniels & Adrian, LLP (57) ABSTRACT

An image processing apparatus includes a buffer unit which stores image data of one input image, an input control unit which causes the buffer unit to store the image data of the input image, a processing operation unit which outputs image data of a processed image generated by performing image processing based on one of a plurality of set processing conditions, a plurality of output control units corresponding to the processing conditions, wherein each output control unit causes the image data necessary when image processing is performed in a corresponding processing condition to be output from the buffer unit to the processing operation unit and causes the image data of the processed image to be output to a subsequent-stage processing circuit, and an output arbitrating unit which determines which processing condition is used to perform the image processing and permits the corresponding output control unit to perform output control.

7 Claims, 7 Drawing Sheets

IMAGE PROCESSING APPARATUS

BACKGROUND OF THE INVENTION

1. Field of the Invention

The present invention relates to an image processing apparatus.

Priority is claimed on Japanese Patent Application No. 2012-222120, filed Oct. 4, 2012, the content of which is incorporated herein by reference.

2. Description of Related Art

In an imaging apparatus such as a still-image camera, a moving-image camera, a medical endoscope camera, or an industrial endoscope camera, an image processing apparatus of a pipeline configuration in which a plurality of image processing circuits, each of which performs image processing, are directly connected is well known. In the above-described image processing apparatus, as illustrated in FIG. 4A, a still image of one frame is divided into a plurality of blocks, and image processing is performed on each division block.

Figure 4A:
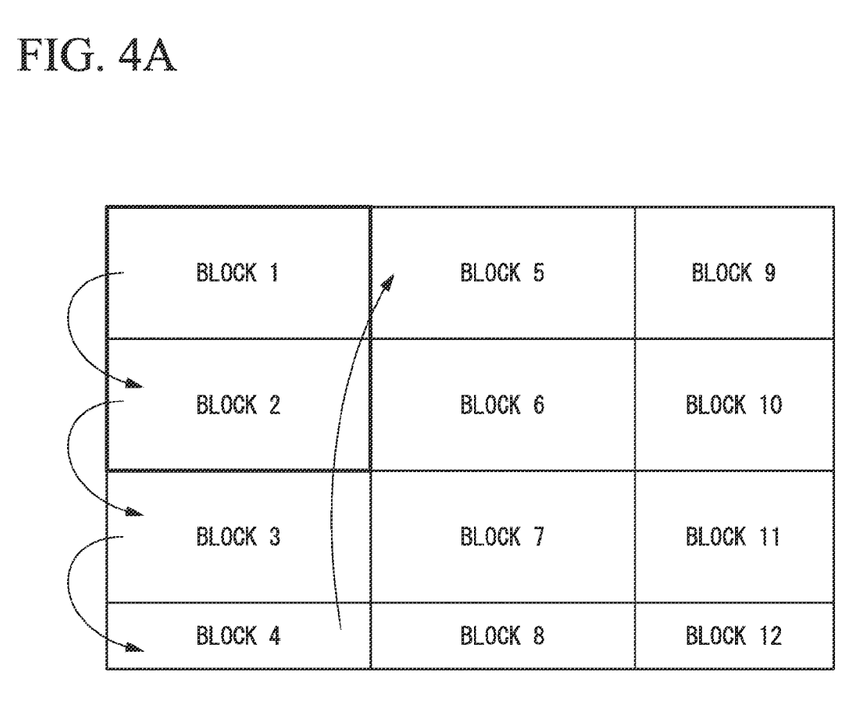
FIGS. 4A and 4B are a diagram illustrating a method of dividing a block of a still image of one frame in a pipeline process of the related art.
Figure 4B:
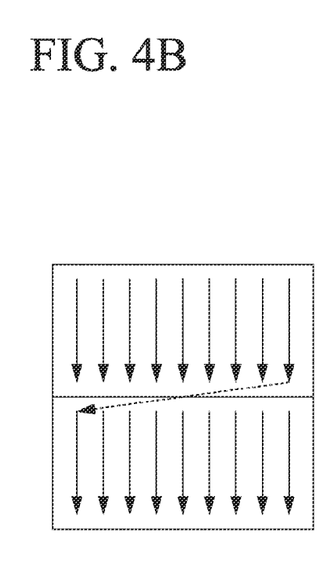

As illustrated in FIG. 4A, when a still image of one frame is divided into a plurality of blocks, the flow of image data to be processed within each division block is continuous. However, the flow of data between different blocks is not continuous (see FIG. 4B). Therefore, there is a need for a procedure to reset an image processing circuit every time processing of one block is completed and to reset the range of image data corresponding to the next block to be processed, or the like each time.

Thus, when an operation of the image processing circuit has been controlled every time each block has been processed, a period of time loss in which no image processing circuit operates occurs during processing of each block as described above. The loss time in which no image processing circuit operates affects the total processing time in a pipeline process of processing a still image of one frame.

For example, technology used to reduce time loss in processing between blocks in a pipeline process is disclosed in Japanese Unexamined Patent Application, First Publication No. 2010-176606. In this technology disclosed in Japanese Unexamined Patent Application, First Publication No. 2010-176606, each image processing circuit constituting a pipeline outputs an interrupt signal (process completion interrupt signal) indicating that a process by an image processing circuit has been completed to a sequencer which controls the overall pipeline process. Accordingly, every time the process completion interrupt signal is input from the image processing circuit, the sequencer individually resets the image processing circuit to change settings. Thereby, a timing at which the sequencer changes the settings of the image processing circuit is a timing at which a process of each image processing circuit for each block has been completed rather than a timing at which processing of a division block is started. In the technology of Japanese Unexamined Patent Application, First Publication No. 2010-176606, the sequencer sets the timing at which the setting of each image processing circuit is changed for every image processing circuit as described above, thereby reducing the time loss in processing between blocks and increasing the speed of the pipeline process for a still image of one frame.

In addition, in the image processing apparatus of the pipeline configuration, for an input/output of image data to be processed, a configuration in which image data stored in an external memory such as a dynamic random access memory (DRAM) connected to a common data bus (direct memory access (DMA) bus) through a burst transfer of DMA is accessed is adopted. In the input/output DMA unit provided in the image processing apparatus of such a configuration, for example, buffers of two sides are provided. Further, reset control of each buffer is divided and writing and reading of image data to and from each of the buffers of the two sides are alternately performed, and hence the processing time is shortened. For example, the output DMA unit shortens the processing time by performing an operation of pre-storing image data of the next block output from a previous-stage image processing circuit in the buffer of the other side while image data stored in the buffer of one side through the burst transfer of DMA is output.

Figure 5:
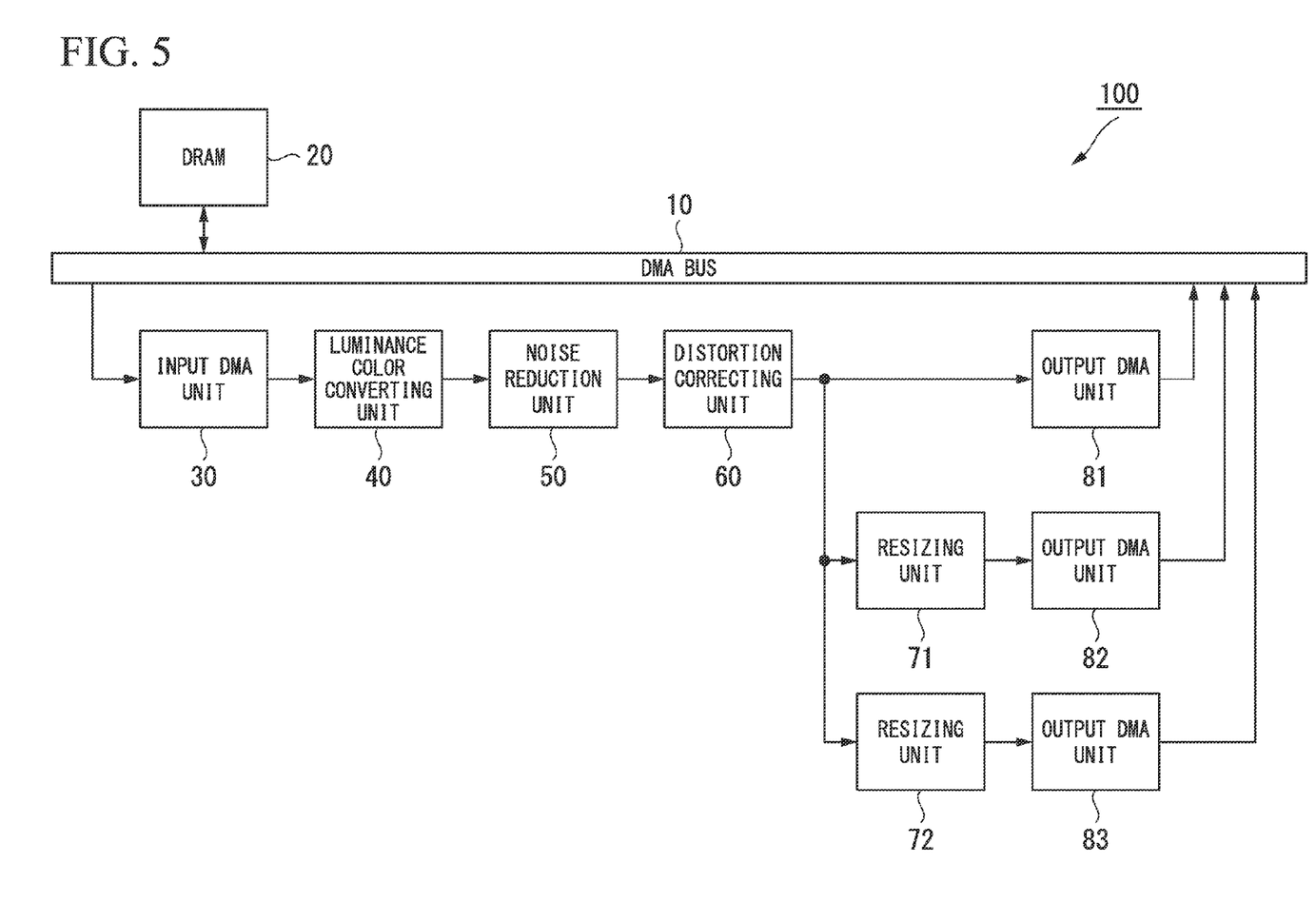
FIG. 5 is a block diagram illustrating an example of a schematic configuration of the image processing apparatus of the related art.

Incidentally, there is an image processing apparatus which generates a plurality of images (hereinafter referred to as processed images) corresponding to the purposes for recording and displaying from image data of a still image of the same one frame among image processing apparatuses of the pipeline configuration. FIG. 5 is a block diagram illustrating an example of a schematic configuration of an image processing apparatus of the related art. The image processing apparatus 100 of the related art illustrated in FIG. 5 is an example of an image processing apparatus that generates three processed images having the same angle of view and a different number of pixels (size).

In the image processing apparatus 100, a pipeline in which image processing circuits necessary to generate a first processed image are directly connected is configured. More specifically, the pipeline used to perform image processing is configured in the order of "DRAM 20→Input DMA unit 30→Luminance color converting unit 40→Noise reduction unit 50→Distortion correcting unit 60→Output DMA unit 81→DRAM 20."

In addition, in the image processing apparatus 100, two pipelines used to generate other processed images by branching a data bus of a specific image processing circuit of the above-described pipeline are configured in order to generate processed images each having a different number of pixels. More specifically, a pipeline used to generate a second processed image in the order of "Resizing unit 71→Output DMA unit 82→DRAM 20" by branching a data bus of the distortion correcting unit 60 and a pipeline used to generate a third processed image in the order of "Resizing unit 72→Output DMA unit 83→DRAM 20" by branching the data bus of the distortion correcting unit 60 are configured.

In the image processing apparatus 100 of such a configuration, the setting and operation of each image processing unit constituting the pipeline are controlled by a sequencer that controls the overall pipeline process and image data flowing through the DMA bus 10 is controlled by a DMA bus arbiter.

Figure 6:
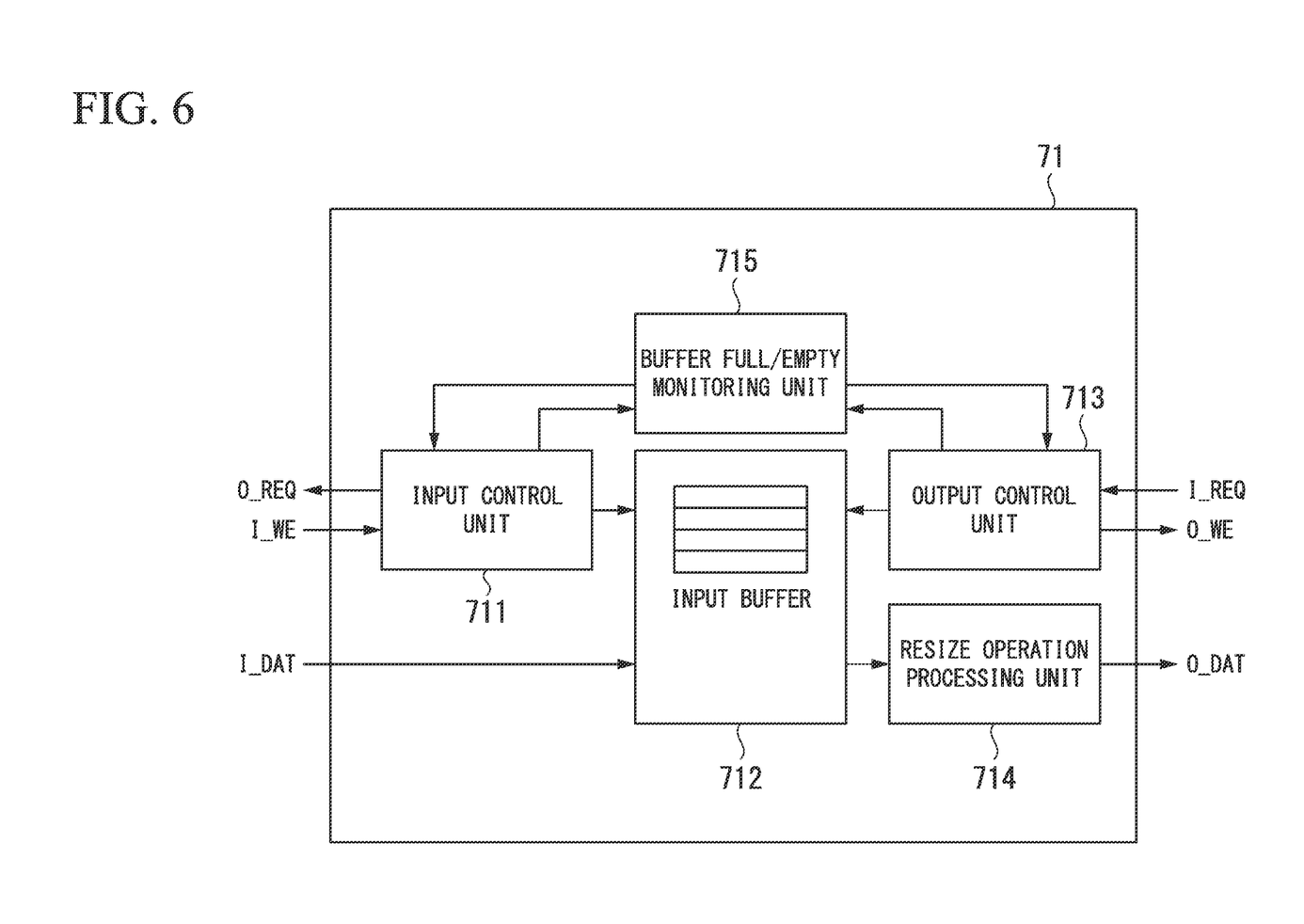
FIG. 6 is a block diagram illustrating an example of a schematic configuration of the resizing unit provided in the image processing apparatus of the related art.

Here, configurations of the resizing units 71 and 72 added to generate processed images each having a different number of pixels will be described. The resizing units 71 and 72 are only different in terms of the number of pixels of a processed image generated by a resizing process, and have the same configuration. Accordingly, in the following description, only the configuration of the resizing unit 71 will be described. FIG. 6 is a block diagram illustrating an example of a schematic configuration of the resizing unit 71 provided in the image processing apparatus 100 of the related art. The resizing unit 71 illustrated in FIG. 6 includes an input control unit 711, an input buffer 712, an output control unit 713, a resize operation processing unit 714, and a buffer full/empty monitoring unit 715.

The input buffer 712 temporarily stores image data output by the previous-stage distortion correcting unit 60 of the pipeline according to control from the input control unit 711, and outputs stored image data according to control from the output control unit 713 to the resize operation processing unit 714.

The buffer full/empty monitoring unit 715 monitors a storage capacity (buffer region) of the input buffer 712 based on a control signal from the distortion correcting unit 60 input to the input control unit 711 and a control signal from the subsequent-stage output DMA unit 82 input to the output control unit 713. Accordingly, the buffer fill/empty monitoring unit 715 notifies the input control unit 711 of information about whether there is empty capacity in the input buffer 712, and notifies the output control unit 713 of information about whether image data capable of being output by performing a resizing process is aligned in the input buffer 712.

When a notification indicating that there is empty capacity in the input buffer 712 has been input from the buffer full/empty monitoring unit 715, the input control unit 711 outputs an image data output request (request) to the distortion correcting unit 60, and causes the input buffer 712 to temporarily store image data input from the distortion correcting unit 60 through a data bus.

The output control unit 713 receives an input of an image data output request from the output DMA unit 82, and causes the image data stored in the input buffer 712 to be output to the resize operation processing unit 714 when the notification indicating that image data capable of being output by performing the resizing process has been aligned has been input from the buffer full/empty monitoring unit 715. Accordingly, the output control unit 713 causes the output DMA unit 82 to write image data on which the resizing process has been performed by the resize operation processing unit 714.

The resize operation processing unit 714 performs the resizing process on the input image data at a predetermined resize ratio, and outputs image data after the resizing process.

In the image processing apparatus 100 of the related art, the resizing units 71 and 72 each having such a configuration are provided, so that a total of three processed images each having a different number of pixels and including a processed image in which distortion has been corrected by the distortion correcting unit 60 and two processed images obtained by resizing the processed image in which distortion has been corrected by the distortion correcting unit 60 are generated. That is, in the image processing apparatus 100 of the related art, a plurality of image processing circuits (resizing units and output DMA units) having the same configuration are provided according to the number of processed images to be generated, and a number of pipelines equal to the number required by the image processing circuits are configured. Accordingly, the processing time of image processing in the image processing apparatus 100 is shortened by operating the image processing circuits constituting the respective pipelines in parallel.

However, as in the image processing apparatus 100 of the related art, corresponding image processing circuits (resizing units and output DMA units in an example illustrated in FIG. 5) having the same configuration should be provided in the image processing apparatus 100 according to an increase in the number of processed images to be generated, that is, an increase in the number of branches of the data bus, in a method of configuring a necessary number of pipelines according to the number of processed images to be generated.

Figure 7:
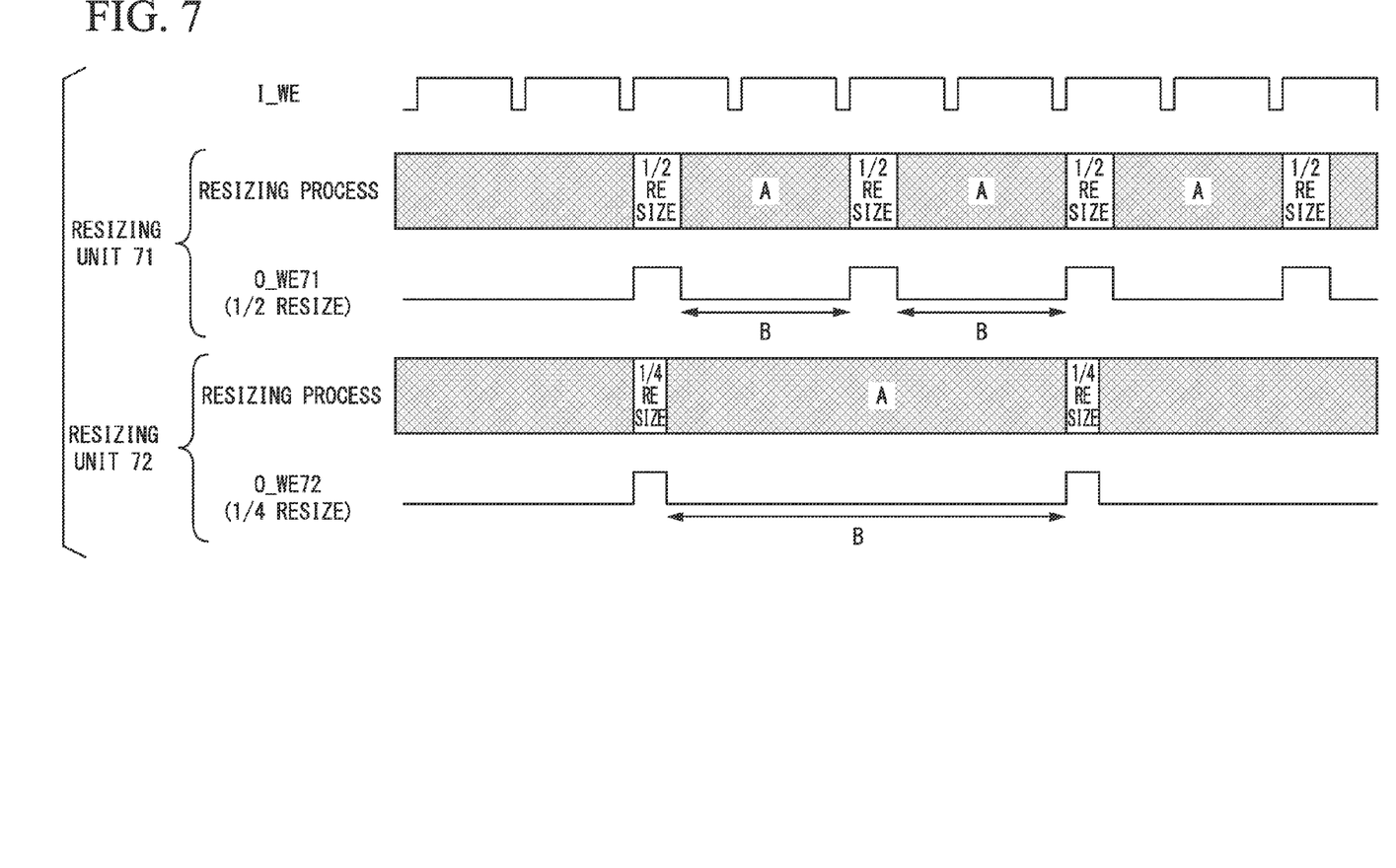
FIG. 7 is a timing chart illustrating an example of a timing at which image data on which the resizing unit provided in the image processing apparatus of the related art has performed a resizing process is output.

In addition, in the image processing apparatus 100 of the related art, each of the resizing units 71 and 72 does not necessarily constantly output a processed image generated by performing the resizing process. FIG. 7 is a timing chart illustrating an example of a timing at which image data on which each of the resizing units 71 and 72 provided in the image processing apparatus 100 of the related art has performed a resizing process is output.

In the timing chart illustrated in FIG. 7, an example of an operation period of the resizing process in which each of the resizing units 71 and 72 provided in the image processing apparatus 100 generates a resized processed image by resizing a processed image generated by the previous-stage distortion correcting unit 60 performing a distortion correction process on a still image of one frame to ½ or ¼ size and a timing at which image data after the resizing process is output to the subsequent-stage output DMA units 82 and 83 is illustrated.

A write signal I_WE illustrated in FIG. 7 indicates the timing at which the distortion correcting unit 60 outputs image data to each of the resizing units 71 and 72, that is, the timing at which image data after the distortion correction process is written to the input buffer 712 provided in each of the resizing units 71 and 72. In addition, a write signal O_WE71 illustrated in FIG. 7 indicates the timing at which the resizing unit 71 outputs image data to the output DMA unit 82, that is, the timing at which the resize operation processing unit 714 provided in the resizing unit 71 outputs image data after the resizing process to the output DMA unit 82 by performing the resizing process on image data after the distortion correction process temporarily stored in the input buffer 712. Likewise, a write signal O_WE72 illustrated in FIG. 7 indicates the timing at which the resizing unit 72 outputs image data after the resizing process performed by the resize operation processing unit 714 to the output DMA unit 83. In the timing chart illustrated in FIG. 7, image data of a period of a "High" level of each of the write signal I_WE, the write signal O_WE71, and the write signal O_WE72 is valid image data.

As illustrated in FIG. 7, transfer rates (cycles of the write signals O_WE71 and O_WE72) when the resizing units 71 and 72 output image data to the corresponding output DMA units 82 and 83 are lower than a transfer rate (a cycle of the write signal I_WE) when the distortion correcting unit 60 outputs image data to each of the resizing units 71 and 72. In addition, in the resizing units 71 and 72, transfer rates (cycles of the write signals O_WE71 and O_WE72) are different when image data after the resizing process is output to the corresponding output DMA units 82 and 83.

More specifically, as illustrated in FIG. 7, the resizing unit 71 having a predetermined resize ratio of ½ performs a resizing process of ½ at a ratio of one for two write signals I_WE, that is, a ratio of one for two lines, and transfers image data after the resizing process to the output DMA unit 82. In addition, the resizing unit 72 having a predetermined resize ratio of ¼ performs a resizing process of ¼ at a ratio of one to four write signals I_WE, that is, a ratio of one to four lines, and transfers image data after the resizing process to the output DMA unit 83.

This results from a resize ratio when each of the resizing units 71 and 72 performs the resizing process, and is because each of the resize operation processing units 714 provided in the resizing units 71 and 72 performs the resizing process according to the predetermined resize ratio after image data necessary to perform the resizing process has been aligned. Because of this, the resizing units 71 and 72 wait for an operation of the resize operation processing unit 714 until image data necessary to perform the resizing process is aligned within the input buffer 712, that is, there is a period in which the resize operation processing unit 714 does not operate in each of the resizing units 71 and 72 as indicated by "A" of FIG. 7. As a result, the activity rate of the resize operation processing unit 714 is lowered. In addition, a period in which the resize operation processing unit 714 does not operate becomes a period (see "B" of FIG. 7) in which no transmission of image data after the resizing process is performed.

Thus, in the image processing apparatus 100 of the related art, a necessary number of pipelines having image processing circuits with the same configuration are configured according to the number of processed images to be generated. However, if there is a period in which no image processing circuit operates as indicated by "A" in FIG. 7, there is a period in which the image processing circuit provided in each pipeline does not perform data transmission as indicated by "B" in FIG. 7.

SUMMARY OF THE INVENTION

According to a first aspect of the present invention, there is provided an image processing apparatus which generates and outputs a plurality of processed images based on a plurality of set processing conditions from one input image input by branching a data bus output by a specific processing circuit within a pipeline comprising a plurality of processing circuits, the image processing apparatus including a buffer having a storage capacity sufficient to store the image data of the one input image, an input control unit which causes the buffer to store the image data of the one input image output from a previous-stage specific processing circuit to the data bus, a processing operation unit which performs image processing on the input image based on one processing condition among the plurality of set processing conditions and outputs image data of the processed image generated by the image processing, a plurality of output control units corresponding to the plurality of set processing conditions, wherein each of the output control units causes the image data necessary when the image processing is performed in a corresponding processing condition within the image data of the one input image stored in the buffer to be output to the processing operation unit, and causes the image data of the processed image generated by the processing operation unit based on the corresponding processing condition to be output to a corresponding subsequent-stage processing circuit, and an output arbitrating unit which determines which of the plurality of processing conditions is used to perform the image processing, and permits the output control unit corresponding to the determined processing condition to perform outputting the image data to the processing operation unit by the buffer.

In addition, according to a second aspect of the present invention, in the image processing apparatus of the first aspect, the output arbitrating unit determines the processing condition in which the image processing is performed based on whether or not the image data necessary when the image processing is performed in the processing condition, is in the buffer, on an output request of the image data of the processed image input from each of the subsequent-stage processing circuits, and on the state each of the subsequent-stage processing circuits which receive the image data of the processed image.

In addition, according to a third aspect of the present invention, in the image processing apparatus of the second aspect, the state of the subsequent-stage processing circuit that receives the image data of the processed image is a state of empty capacity of a buffer provided in the subsequent-stage processing circuit, and the output arbitrating unit determines the output control unit that permits output control in which the image data of the processed image is preferentially output to the subsequent-stage processing circuit having the buffer having a large empty capacity.

In addition, according to a fourth aspect of the present invention, in the image processing apparatus of the third aspect, the storage capacity provided in the buffer is a storage capacity corresponding to the processing condition in which most image data is necessary in the image processing based on each processing condition set in the processing operation unit.

In addition, according to a fifth aspect of the present invention, the image processing apparatus of the fourth aspect further includes a buffer monitoring unit which monitors the storage capacity provided in the buffer, notifies the input control unit of information about whether there is empty capacity in the buffer, and notifies each of the output control units of information about whether the image data necessary when the processing operation unit performs the image processing is complete in the buffer, wherein, when a state in which the image data stored in the buffer is not output from any of the output control units to the processing operation unit is reached, the buffer monitoring unit determines that there is empty capacity in which the image data is able to be stored in the buffer.

In addition, according to a sixth aspect of the present invention, in the image processing apparatus of the fifth aspect, the buffer monitoring unit determines whether the image data necessary when the processing operation unit performs the image processing is complete in the buffer for every processing condition corresponding to each of the output control units, and outputs information on whether the necessary image data corresponding to each of the output control units is complete to the output arbitrating unit as information indicating whether the image data necessary when the image processing is performed in the processing condition is complete in the buffer.

In addition, according to a seventh aspect of the present invention, in the image processing apparatus of the sixth aspect, when a notification indicating that there is empty capacity in the buffer has been input from the buffer monitoring unit, the input control unit requests a previous-stage specific processing circuit to output the image data of the one input image.

DETAILED DESCRIPTION OF THE INVENTION

Figure 1:
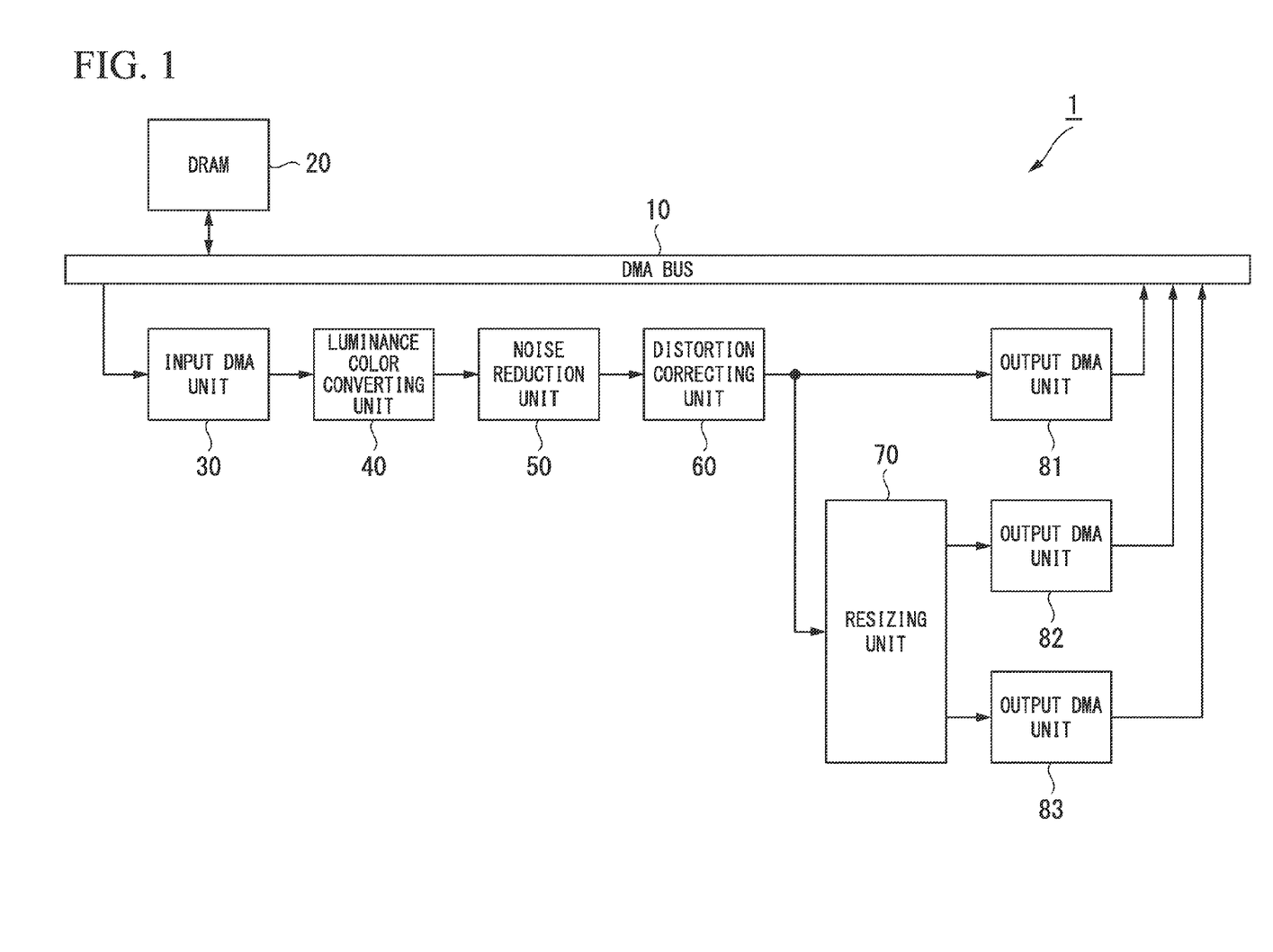
FIG. 1 is a block diagram illustrating an example of a schematic configuration of an image processing apparatus of an embodiment of the present invention.

Hereinafter, an embodiment of the present invention will be described with reference to the drawings. FIG. 1 is a block diagram illustrating an example of a schematic configuration of an image processing apparatus in this embodiment. The image processing apparatus 1 illustrated in FIG. 1 includes a DRAM 20, an input DMA unit 30, a luminance color converting unit 40, a noise reduction unit 50, a distortion correcting unit 60, a resizing unit 70, and output DMA units 81 to 83. Like the image processing apparatus 100 of the related art illustrated in FIG. 5, the image processing apparatus 1 generates three processed images each having a different number of pixels.

In the image processing apparatus 1, like the image processing apparatus 100 of the related art illustrated in FIG. 5, a pipeline in which image processing circuits necessary to generate a first processed image are directly connected is configured. More specifically, the pipeline used to generate image processing in the order of "DRAM 20→Input DMA unit 30→Luminance color converting unit 40→Noise reduction unit 50→Distortion correcting unit 60→Output DMA unit 81→DRAM 20" is configured.

In addition, in the image processing apparatus 1, in order to generate processed images each having a different number of pixels, two pipelines used to generate other processed images are configured by branching a data bus of a specific image processing circuit of the above-described pipeline. However, in the image processing apparatus 1, the resizing unit 70 is commonly used in the two pipelines used to generate the other processed images because only the resizing unit 70 generates two processed images each having a different number of pixels. More specifically, although a pipeline used to generate a second processed image in the order of "Resizing unit 70→Output DMA unit 82→DRAM 20" and a pipeline for generating a third processed image in the order of "Resizing unit 70→Output DMA unit 83→DRAM 20" are configured by branching the data bus of the distortion correcting unit 60, the resizing unit 70 is shared between the two pipelines.

In the image processing apparatus 1, like the image processing apparatus 100 of the related art illustrated in FIG. 5, the setting and operation of each image processing unit constituting the pipeline are controlled by a sequencer that controls the overall pipeline process and image data flowing to the DMA bus 10 is controlled by a DMA bus arbiter. In addition, like the image processing apparatus 100 of the related art illustrated in FIG. 5, the image processing apparatus 1 divides a still image of one frame into a plurality of blocks, and performs image processing for each the divided blocks as illustrated in FIG. 4A.

More specifically, the input DMA unit 30 acquires image data necessary for processing from the DRAM 20, by a burst transfer (hereinafter referred to as "DMA transfer") of DMA via the DMA bus 10. Accordingly, processes corresponding to the luminance color converting unit 40, the noise reduction unit 50, and the distortion correcting unit 60 are sequentially performed on image data acquired by the input DMA unit 30 and a first processed image is generated. Thereafter, the output DMA unit 81 outputs image data of the first processed image generated by the distortion correcting unit 60 performing the distortion correction process to the DRAM 20, by a DMA transfer via the DMA bus 10.

In addition, in the image processing apparatus 1, the resizing unit 70 designates the first processed image generated by the distortion correcting unit 60 performing the distortion correction process as an input image. A resizing process is performed on image data of the input image, and second and third processed images are generated. Thereafter, the output DMA unit 82 outputs image data of the second processed image generated by the resizing unit 70 performing the resizing process to the DRAM 20, by a DMA transfer via the DMA bus 10. In addition, the output DMA unit 83 outputs image data of the third processed image generated by the resizing unit 70 performing the resizing process to the DRAM 20, by a DMA transfer via the DMA bus 10.

The image processing apparatus 1 is only different from the image processing apparatus 100 of the related art illustrated in FIG. 5 in that only one resizing unit 70 is provided in the image processing apparatus 1. Two resizing units, i.e., the resizing units 71 and 72, are provided in the image processing apparatus 100 of the related art, each the resizing units 71 and 72 generates each two processed images having a different number of pixels. However, the one resizing unit 70 can generate two processed images having a different number of pixels in the image processing apparatus 1.

Figure 2:
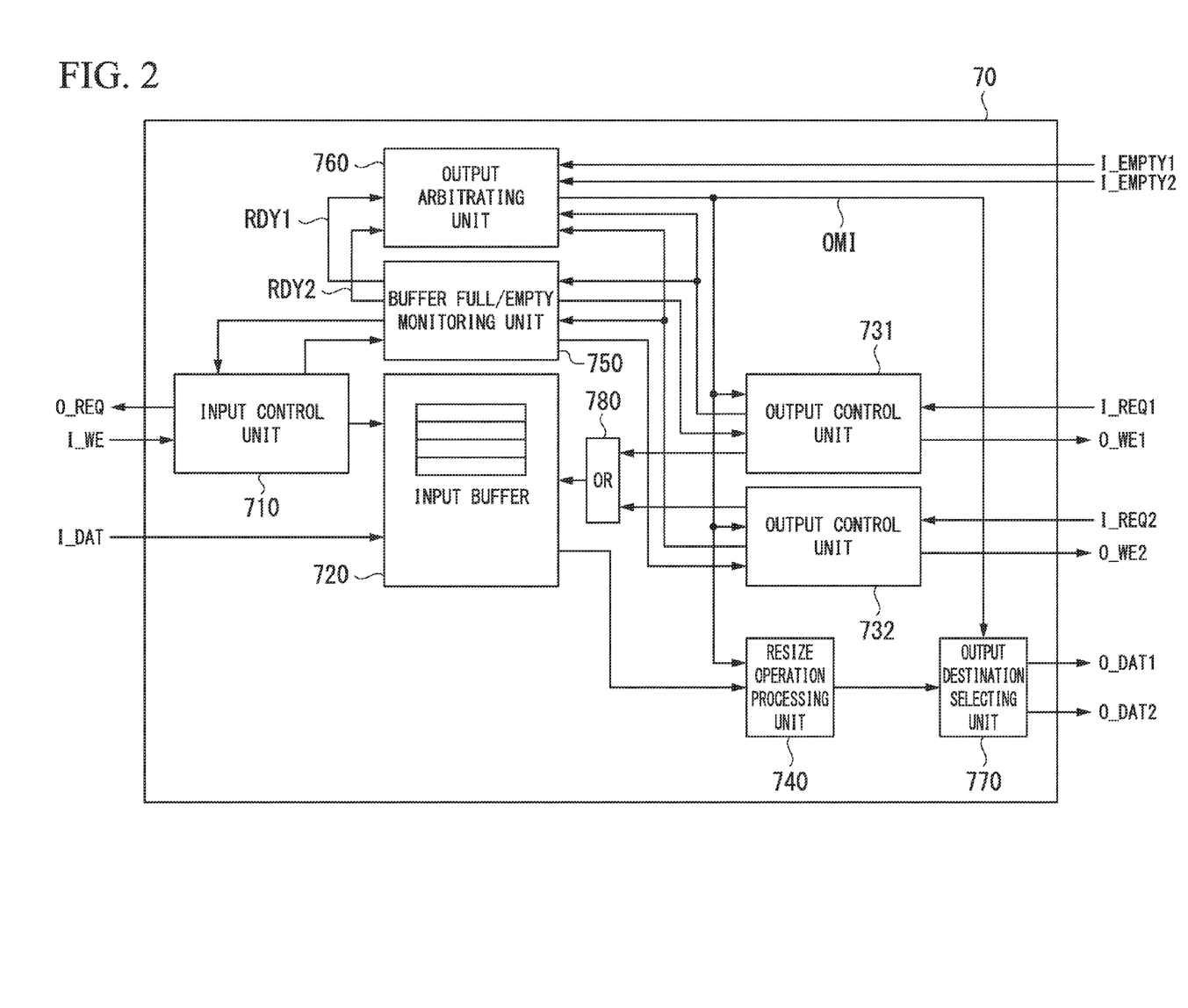
FIG. 2 is a block diagram illustrating an example of a schematic configuration of a resizing unit provided in the image processing apparatus of this embodiment.

Here, the resizing unit 70 that generates each the two processed images having a different number of pixels will be described. FIG. 2 is a block diagram illustrating an example of a schematic configuration of the resizing unit 70 provided in the image processing apparatus 1 of this embodiment. The resizing unit 70 illustrated in FIG. 2 includes an input control unit 710, an input buffer 720, output control units 731 and 732, a resize operation processing unit 740, a buffer full/empty monitoring unit 750, an output arbitrating unit 760, an output destination selecting unit 770, and an OR circuit 780.

The input buffer 720 temporarily stores image data output by the previous-stage distortion correcting unit 60 of the pipeline according to control from the input control unit 710, and outputs the stored image data to the resize operation processing unit 740 according to control of any of the output control units 731 and 732 input via the OR circuit 780. The input buffer 720 includes a storage capacity in which a maximum amount of image data which the resizing unit 70 uses to generate two processed images having a different number of pixels can be stored.

The buffer full/empty monitoring unit 750 monitors the storage capacity (buffer region) of the input buffer 720, based on a control signal from the distortion correcting unit 60 input to the input control unit 710, on a control signal from the subsequent-stage output DMA unit 82 input to the output control unit 731, and on a control signal from the subsequent-stage output DMA unit 83 input to the output control unit 732. Accordingly, the buffer full/empty monitoring unit 750 notifies the input control unit 710 of information about whether there is empty capacity in the input buffer 720, and notifies each of the output control unit 731 and the output control unit 732 of information about whether image data capable of being output by performing the resizing process of the input buffer 720 is aligned.

In a determination whether there is empty capacity in the input buffer 720 by the buffer full/empty monitoring unit 750, it is determined that there is empty capacity in the input buffer 720 when a state in which image data stored in the input buffer 720 is not output to the resize operation processing unit 740 by any of the output control unit 731 and the output control unit 732 is reached. This is the reason as followings. When image data that the output control unit 731 outputs to the resize operation processing unit 740 so as to generate the second processed image is the same as image data that the output control unit 732 outputs to the resize operation processing unit 740 so as to generate the third processed image, an image data output from the input buffer 720 so as to generate one processed image may be re-output from the input buffer 720 so as to generate another processed image.

Accordingly, the buffer full/empty monitoring unit 750 does not notify the input control unit 710 that there is empty capacity in the input buffer 720 when an image data output to the resize operation processing unit 740 by any of the output control unit 731 and 732 is stored in the input buffer 720. Thereby, it is possible to prevent image data to be used to generate another processed image from being absent.

In addition, when a state in which image data capable of being output by performing the resizing process is aligned in the input buffer 720 is reached, the buffer full/empty monitoring unit 750 outputs output preparation completion information indicating the state to the output arbitrating unit 760. In FIG. 2, a configuration in which output preparation completion information RDY1 is output to the output arbitrating unit 760 when a state in which the image data to be output to the resize operation processing unit 740 by the output control unit 731 is aligned in the input buffer 720 is reached, and output preparation completion information RDY2 is output to the output arbitrating unit 760 when a state is illustrated in which image data to be output to the resize operation processing unit 740 by the output control unit 732 is aligned in the input buffer 720 is reached.

When a notification indicating that there is empty capacity in the input buffer 720 has been input from the buffer full/empty monitoring unit 750, the input control unit 710 outputs a request signal O_REQ used to perform an output request (request) of image data in regard to the distortion correcting unit 60. Accordingly, the input control unit 710 causes the input buffer 720 to temporarily store image data input from the distortion correcting unit 60 through a data bus I_DAT according to a write signal I_WE input from the distortion correcting unit 60.

The output arbitrating unit 760 determines (arbitrates) an output destination of the image data after the resizing process output by performing the resizing process. The determination (arbitration) of the output destination of the image data by the output arbitrating unit 760 is performed based on buffer empty information I_EMPTY1 indicating empty capacity of a buffer within the subsequent-stage output DMA unit 82, on buffer empty information I_EMPTY2 indicating empty capacity of a buffer within the output DMA unit 83, on the output preparation completion information RDY1 and RDY2 input from the buffer full/empty monitoring unit 750, on a control signal from the output DMA unit 82 input to the output control unit 731, and on a control signal from the output DMA unit 83 input to the output control unit 732. Here, the buffer empty information I_EMPTY1 output from the subsequent-stage output DMA unit 82 of the pipeline and the buffer empty information I_EMPTY2 output from the output DMA unit 83, for example, indicate the number of lines of image data writable to the buffer provided in each of the output DMA units 82 and 83.

In the image processing apparatus 1, as described above, DMA transfers by the output DMA units 82 and 83 through the DMA bus 10 are managed by the DMA bus arbiter.

In addition to the output DMA units 82 and 83, another component that processes image data and other data is also connected to the DMA bus 10. Because of this, the DMA bus arbiter manages timings of data to be output by all components connected to the DMA bus 10. Accordingly, the DMA transfer in which each of the output DMA units 82 and 83 outputs image data to the DMA bus 10 is not necessarily executed at a fixed timing. The timing to be executed may fluctuate by DMA access such as the DMA transfer to be performed by a component other than the output DMA units 82 and 83 connected to the DMA bus 10. Because of this, a buffer which absorbs the fluctuation of the timing at which the DMA transfer is executed and reliably performs the DMA transfer is provided in the output DMA units 82 and 83. However, the empty capacity of the buffer fluctuates in association with the fluctuation of the timing at which the DMA transfer is executed.

Accordingly, in the determination (arbitration) of the output destination of the image data by the output arbitrating unit 760, the empty capacity of each the buffers within the output DMA units 82 and 83 and a state of whether image data used to perforin the resizing process is aligned in the input buffer 720 within the resizing unit 70 are constantly monitored in order to keep the DATA transfers performing by the output DMA units 82 and 83. Further, an output request of image data from each of the output DMA units 82 and 83 is constantly monitored. Accordingly, the output arbitrating unit 760 controls causing any one of the output control units 731 and 732 having high priority to output an image data stored in the input buffer 720 to the resize operation processing unit 740.

On the other hand, the controls when the output arbitrating unit 760 does not monitor the empty capacity of each the buffers within the output DMA units 82 and 83, a state of whether image data used to perform the resizing process is aligned in the input buffer 720 within the resizing unit 70, and an output request of image data from each of the output DMA units 82 and 83 are considered. In this case, the output arbitrating unit 760 performs control to iterate an output of image data in the fixed order according to a resize ratio of image data after the resizing process to be output to the output DMA units 82 and 83.

When the control to iterate the output of image data in this fixed order is performed, there is no empty capacity of the buffers within the output DMA unit 82 or 83. As a result, the output DMA unit 82 or 83 may not receive the image data after the resizing process output by the resizing unit 70. For example, the resize ratio (processing condition) of the resizing process to be performed by the resize operation processing unit 740 may be ½ and ¼, and the output arbitrating unit 760 may perform control to iterate an operation of outputting image data resized to ¼ size to the output DMA unit 83 once after image data resized to ½ size has been output to the output DMA unit 82 twice. In this case, for example, when there is no empty capacity within the output DMA unit 82 in the output of first image data resized to ½ size, the output DMA unit 82 cannot receive an output of second image data resized to ½ size from the resizing unit 70. Thereby, next, the output DMA unit 83 receiving image data resized to ¼ size from the resizing unit 70 does not receive image data until the output DMA unit 82 completely receives second image data resized to ½ size even when there is empty capacity in the buffer. When such a state is reached, the DMA transfers by the output DMA units 82 and 83 to the DRAM 20 are interrupted and the overall processing speed of the image processing apparatus 1 is lowered.

To avoid this state, the output arbitrating unit 760 optimizes the timing at which output arbitration information OMI that is information determined (arbitrated) by the output arbitrating unit 760 is output so that the fluctuation of the transfer rate of image data by the output DMA units 82 and 83 does not affect the overall processing speed of the image processing apparatus 1. That is, the output arbitrating unit 760 controls so that the image data after the resizing process is output in regard to the output DMA unit 82 or 83 capable of receiving image data without performing control used to iterate the output of the image data in the fixed order according to the resize ratio of the image data after the resizing process. Thus, the output arbitrating unit 760 optimizes the timing at which the image data after the resizing process is output to the output DMA units 82 and 83, based on the empty capacity of each the buffers within of the subsequent-stage output DMA units 82 and 83, on a preparation state of image data stored in the input buffer 720, and on an image data output request of each of the output DMA units 82 and 83.

More specifically, the output preparation completion information RDY1 indicates a state in which image data used to perform the resizing process corresponding to the output control unit 731 is aligned in the input buffer 720. When the buffer empty information I_EMPTY1 output from the output DMA unit 82 corresponding to the output control unit 731 indicates that there is empty capacity in the buffer, the state is determined to be a state in which an input of an image data output request from the output DMA unit 82 can be received. In this state, when the image data output request from the output DMA unit 82 is input, the output arbitrating unit 760 outputs the output arbitration information OMI indicating that the reception of the output request from the output DMA unit 82 is permitted.

In addition, the output preparation completion information RDY2 indicates a state in which image data used to perform the resizing process corresponding to the output control unit 732 is aligned in the input buffer 720. When the buffer empty information I_EMPTY2 output from the output DMA unit 83 corresponding to the output control unit 732 indicates that there is empty capacity in the buffer, the state is determined to be a state in which an input of an image data output request from the output DMA unit 83 can be received. In this state, when the image data output request from the output DMA unit 83 is input, the output arbitrating unit 760 outputs the output arbitration information OMI indicating that the reception of the output request from the output DMA unit 83 is permitted.

When the image data output requests from the output DMA units 82 and 83 have been simultaneously input in a state in which inputs of the image data output requests from the output DMA units 82 and 83 can be received, the following process is performed. That is, the output arbitrating unit 760 outputs the output arbitration information OMI indicating that the reception of one output request having high priority is permitted. Next, after the output of image data after the resizing process has been completed, the output arbitration information OMI indicating that the reception of the other output request is permitted is output. The priority, for example, may be the order in which image data is output after a predetermined resizing process, or may be a method of increasing priority of the output DMA unit 82 or 83 capable of writing more image data based on information about the number of lines of image data writable to buffers indicated by the buffer empty information I_EMPTY1 and the buffer empty information I_EMPTY2.

By the output arbitration information OMI, any one of the output control units 731 and 732 having high priority causes the image data stored in the input buffer 720 to be output, and an output destination (the output DMA unit 82 or 83) of the image data on which the resizing process has been performed from the resize operation processing unit 740 is selected.

Each of the output control units 731 and 732 receives the input of the output request of image data from the corresponding output DMA unit 82 or 83. In addition, when a notification indicating that image data capable of being output by performing the resizing process is aligned has been input from the buffer full/empty monitoring unit 750, each of the output control units 731 and 732 causes the image data stored in the input buffer 720 to be output to the resize operation processing unit 740. Accordingly, each of the output control units 731 and 732 causes the corresponding output DMA unit 82 or 83 to write image data on which the resizing process has been performed by the resize operation processing unit 740.

More specifically, the output control unit 731 receives a request signal I_REQ1 which is an image data output request input from the corresponding output DMA unit 82. In addition, the output control unit 731 controls the output of image data to the resize operation processing unit 740 for the input buffer 720, and outputs a write signal O_WE1 of image data to be output to the output DMA unit 82 at a timing at which image data on which the resizing process has been performed by the resize operation processing unit 740 is output. In addition, the output control unit 732 receives a request signal I_REQ2 which is an image data output request input from the corresponding output DMA unit 83. In addition, the output control unit 732 controls an output of image data to the resize operation processing unit 740 for the input buffer 720, and outputs a write signal O_WE2 of image data to be output to the output DMA unit 83 at a timing at which image data on which the resizing process has been performed by the resize operation processing unit 740 is output.

When the image data stored in the input buffer 720 is output to the resize operation processing unit 740 by output control of any of the output control units 731 and 732, the resize operation processing unit 740 outputs image data after the resizing process. As described above, the timing at which the image data after the resizing process by the resizing unit 70 is output to the output DMA units 82 and 83 is optimized by the output arbitrating unit 760.

Accordingly, each of the output control units 731 and 732 performs output control of image data to the resize operation processing unit 740 for the input buffer 720 so that image data on which the resizing process has been performed is output to the output destination determined (arbitrated) by the output arbitrating unit 760. That is, each of the output control units 731 and 732 receives an image data output request from the corresponding output DMA unit 82 or 83. In each of the output control units 731 and 732, the output control of image data to the resize operation processing unit 740 for the input buffer 720 is not directly performed after a notification indicating that the image data capable of being output by performing the resizing process is aligned has been input from the buffer full/empty monitoring unit 750. Any one of the output control units 731 and 732 permitted by the output arbitration information OMI output from the output arbitrating unit 760 performs output control for the input buffer 720.

The resize operation processing unit 740 outputs image data after the resizing process by performing any one of the resizing process at a resize ratio (processing condition) corresponding to the output control unit 731 and the resizing process at a resize ratio (processing condition) corresponding to the output control unit 732 on the input image data. In the resize operation processing unit 740, the resize ratio of the resizing process corresponding to the output control unit 731 and the resize ratio of the resizing process corresponding to the output control unit 732 are predetermined. The resize operation processing unit 740 switches the resize ratio when the resizing process is performed according to whether the resizing process corresponding to the output control unit 731 or the resizing process corresponding to the output control unit 732 is to be performed. In FIG. 2, a configuration in which the resize ratio is switched when the resizing process is performed based on the output arbitration information OMI output from the output arbitrating unit 760 is illustrated.

The switching of the resize ratio in the resize operation processing unit 740 is not limited to a method of performing switching based on the output arbitration information OMI output by the output arbitrating unit 760 illustrated in FIG. 2, and a configuration in which the resize ratio is switched when the resizing process is performed by another method can be made. For example, an interrupt signal (process completion interrupt signal) indicating that the resizing process by the resize operation processing unit 740 has been completed is output to the sequencer which controls the overall pipeline process. Thereafter, the sequencer can be configured to change the setting of the resize ratio when the next resizing process is performed based on the output arbitration information OMI output from the output arbitrating unit 760 at every time the process completion interrupt signal is input from the resize operation processing unit 740.

The output destination selecting unit 770 switches an output destination of image data on which the resizing process has been performed by the resize operation processing unit 740 based on the output arbitration information OMI output from the output arbitrating unit 760. More specifically, when the output DMA unit 82 is selected as the output destination of the image data by the output arbitration information OMI, the image data on which the resizing process has been performed by the resize operation processing unit 740 is switched to be output to a data bus O_DAT1 for the output DMA unit 82. In addition, when the output DMA unit 83 is selected as the output destination of the image data by the output arbitration information OMI, the image data on which the resizing process has been performed by the resize operation processing unit 740 is switched to be output to a data bus O_DAT2 for the output DMA unit 83.

Figure 3:
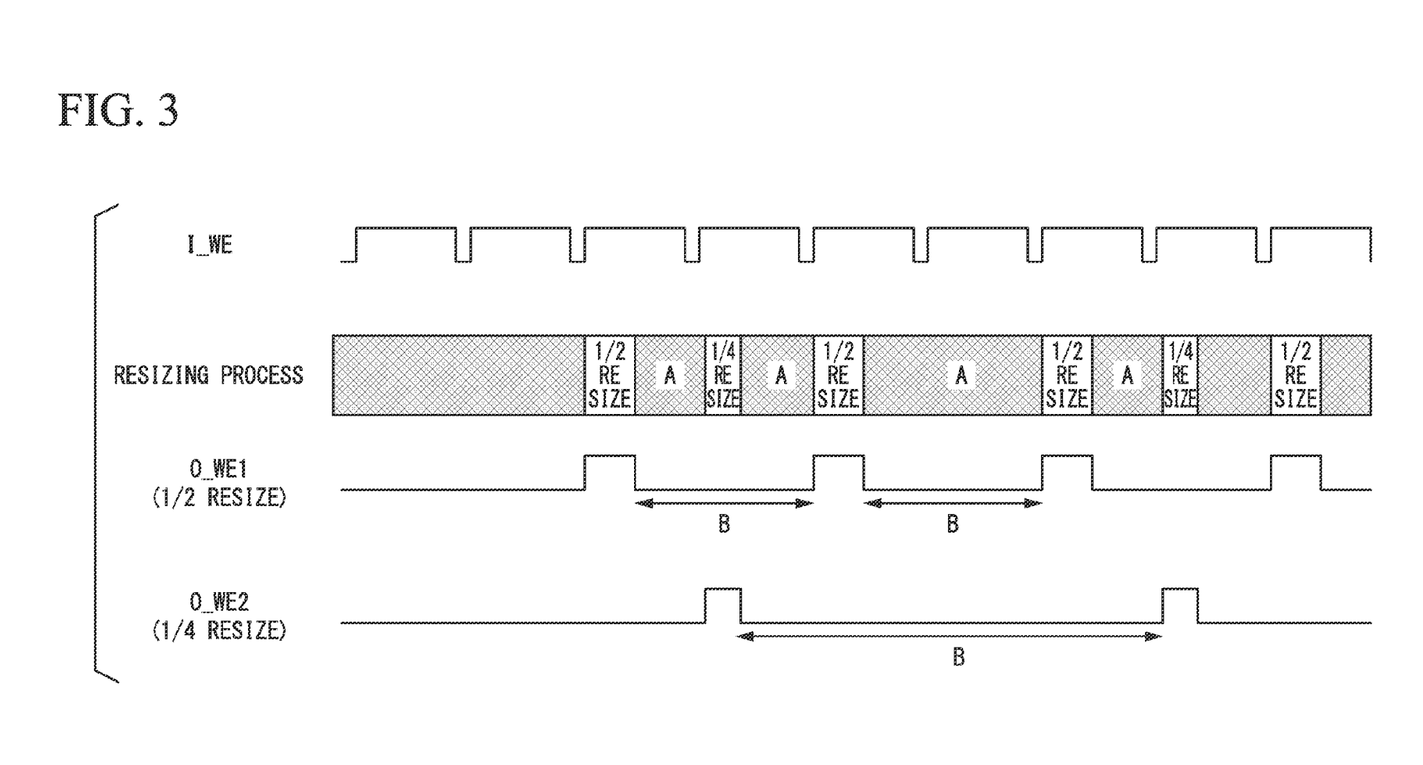
FIG. 3 is a timing chart illustrating an example of a timing at which the resizing unit provided in the image processing apparatus of this embodiment outputs image data on which a resizing process has been performed.

Next, the timing of the resizing process in the resizing unit 70 provided in the image processing apparatus 1 of this embodiment will be described. FIG. 3 is a timing chart illustrating an example of a timing at which the resizing unit 70 provided in the image processing apparatus 1 of this embodiment outputs image data on which the resizing process has been performed.

In the timing chart illustrated in FIG. 3, an example of an operation period of the resizing process in which the resizing unit 70 provided in the image processing apparatus 1 generates a resized processed image by resizing a processed image generated by the previous-stage distortion correcting unit 60 performing a distortion correction process on a still image of one frame to each of ½ and ¼ sizes and a timing at which image data after the resizing process is output to the subsequent-stage output DMA units 82 and 83 is illustrated. The timing chart illustrated in FIG. 3 is a processing timing when each of the resizing units 71 and 72 provided in the image processing apparatus 100 of the related art performs an operation similar to the operation (see FIG. 7) of generating and outputting a resized processed image.

A write signal I_WE illustrated in FIG. 3 indicates the timing at which the distortion correcting unit 60 outputs image data to the resizing unit 70, that is, the timing at which image data after the distortion correction process is written to the input buffer 720 provided in the resizing unit 70. In addition, a write signal O_WE1 illustrated in FIG. 3 indicates the timing at which the resizing unit 70 outputs image data to the output DMA unit 82, that is, the timing at which the resize operation processing unit 740 provided in the resizing unit 70 outputs image data after the resizing process to the output DMA unit 82 by performing the resizing process on image data after the distortion correction process temporarily stored in the input buffer 720. Likewise, a write signal O_WE2 illustrated in FIG. 3 indicates the timing at which the resizing unit 70 outputs image data after the resizing process performed by the resize operation processing unit 740 to the output DMA unit 83. Even in the timing chart illustrated in FIG. 3, image data of a period in which each of the write signal I_WE, the write signal O_WE1, and the write signal O_WE2 has a "High" level is valid data.

As illustrated in FIG. 3, transfer rates (cycles of the write signals O_WE1 and O_WE2) when the resizing unit 70 outputs image data to the corresponding output DMA units 82 and 83 are lower than a transfer rate (a cycle of the write signal I_WE) when the distortion correcting unit 60 outputs image data to the resizing unit 70. In addition, in the resizing unit 70, transfer rates (cycles of the write signals O_WE1 and O_WE2) when image data after the resizing process is output to the corresponding output DMA units 82 and 83 are different. This is similar to a transfer rate of each image data in the image processing apparatus 100 of the related art illustrated in FIG. 7, and results from a resize ratio when the resizing unit 70 performs each resizing process in a similar manner as in the image processing apparatus 100 of the related art.

More specifically, as illustrated in FIG. 3, image data after the resizing process by performing the resizing process of ½ at a ratio of one for two write signals I_WE, that is, a ratio of one for two lines, is transferred to the output DMA unit 82 which outputs image data after the resizing process in which the resize ratio is ½. In addition, image data after the resizing process by performing the resizing process of ¼ at a ratio of one for four write signals I_WE, that is, a ratio of one for four lines, is transferred to the output DMA unit 83 which outputs image data after the resizing process in which the resize ratio is ¼. That is, even in the configuration of the image processing apparatus 1, as in the image processing apparatus 100 of the related art, it is difficult for a plurality of components connected to the DMA bus 10 to simultaneously output data and only one of the output DMA units 82 and 83 can output image data to the DMA bus 10 in the configuration of the image processing apparatus 1 illustrated in FIG. 1.

That is, as described above, even in the image processing apparatus 1, there are periods as indicated by "B" of FIG. 3 in which image data after the resizing process is not transferred to the output DMA unit according to a resize ratio when the resizing unit 70 performs each resizing process. However, in the image processing apparatus 1, the output arbitrating unit 760 determines (arbitrates) an output destination of the image data after the resizing process. At this time, the output arbitrating unit 760 optimizes a timing at which the image data after the resizing process is output to the output DMA units 82 and 83 based on empty capacities of buffers and image data output requests within the output DMA units 82 and 83, and on a preparation state of image data stored in the input buffer 720 within the resizing unit 70. More specifically, as seen and is known from FIG. 3, a timing at which the image data after the resizing process is output is optimized so that the image data after the resizing process is output to the output DMA unit 83 at a timing at which the image data after the resizing process is not output to the output DMA unit 82.

Thereby, even when only one resize operation processing unit 740 is provided in the image processing apparatus 1, two processed images having a different number of pixels can be generated as in the image processing apparatus 100 of the related art. Even when image data of the generated processed image is output, a transfer rate similar to that of the image processing apparatus 100 of the related art can be secured. That is, periods in which a transfer of image data after the resizing process to the output DMA unit is not performed, indicated by "B" of FIG. 3, is similar to periods in the image processing apparatus 100 of the related art, indicated by "B" of FIG. 7.

In addition, the optimization of the timing at which the image data after the resizing process by the output arbitrating unit 760 is output, also corresponds to a determination (arbitration) of a resizing process to be performed by the resize operation processing unit 740. As indicated by "A" of FIG. 3, periods in which the resize operation processing unit 740 does not operate, are reduced and the activity rate of the resize operation processing unit 740 can be improved.

As described above, in the resizing unit 70 provided in the image processing apparatus 1 of this embodiment, the one resize operation processing unit 740 generates two processed images having a different number of pixels and switches an output destination of each generated processed image. Thereby, in the resizing unit 70 provided in the image processing apparatus 1 of this embodiment, the one resize operation processing unit 740 can implement a resizing process similar to that performed using the resize operation processing unit 714 provided in each of the two resizing units (the resizing units 71 and 72) in the image processing apparatus 100 of the related art illustrated in FIG. 5.

In addition, in the resizing unit 70 provided in the image processing apparatus 1 of this embodiment, the input control unit 711, the input buffer 712, the buffer full/empty monitoring unit 715, and the resize operation processing unit 714 of the resizing unit 71 provided in the image processing apparatus 100 of the related art illustrated in FIG. 6 are shared and a configuration having a new output arbitrating unit 760 is provided. Thereby, in the resizing unit 70 provided in the image processing apparatus 1 of this embodiment, it is possible to reduce a circuit scale of the resizing unit 70 (particularly, circuit scales of the input buffer 720 and the resize operation processing unit 740).

Thus, it is possible to reduce a circuit scale of the overall image processing apparatus 1 in a state in which the same processing speed as that of the image processing apparatus 100 of the related art has been maintained in the resizing unit 70 provided in the image processing apparatus 1 of this embodiment. In addition, the activity rate of the resize operation processing unit 740 is improved in order to perform a resizing process performed by each of the resize operation processing unit 714 provided in the resizing unit 71 of the image processing apparatus 100 of the related art and the resize operation processing unit 714 provided in the resizing unit 72 of the image processing apparatus 100 of the related art, in one resize operation processing unit 740.

As described above, according to the embodiment of the present invention, when the image processing apparatus 1 which generates a plurality of processed images by performing similar image processing, using image data output by a specific image processing circuit constituting an image processing pipeline, is configured, some components are shared and operations of components when each processed image is generated are switched. Thereby, in a state in which a processing speed similar to that of the image processing apparatus of the related art has been maintained in the image processing apparatus of this embodiment, it is possible to reduce a circuit scale of an image processing circuit provided in the image processing apparatus and improve the activity rate of a component provided in the image processing circuit.

Although the case in which the image processing is the resizing process has been described in this embodiment, the image processing to which a concept of the present invention is applicable is not limited to the resizing process described in the embodiment of the present invention. In addition, the case in which two processed images each having a different number of pixels is generated by performing a resizing process has been described in this embodiment. However, a number of processed images to be generated by the image processing is not limited to the number (two) described in the embodiment of the present invention. As long as there is a period in which one component (the resize operation processing unit 740 in this embodiment) does not operate, it is possible to cause the one component to perform the process. That is, unless the activity rate of the image processing circuit is 100%, it is possible to cause the one component to generate more processed images. However, even when more processed images have been generated, it is necessary to consider whether image data accurately flows through the DMA bus 10, that is, whether the use rate of the DMA bus 10 is in a range which does not exceed 100%.

The case in which the pipeline configuration is "DRAM 20→Input DMA unit 30→Luminance color converting unit 40→Noise reduction unit 50→Distortion correcting unit 60→Output DMA unit 81→DRAM 20," and two processed images are generated by branching the data bus of the distortion correcting unit 60 has been described in this embodiment. However, a processing pipeline to which the concept of the present invention is applicable or a position at which a data bus is branched is not limited to an image processing pipeline. For example, when a data bus output by a component positioned at any position of the pipeline is branched such as when the data bus of the noise reduction unit 50 is branched, the concept of the present invention can be applied.

While preferred embodiments of the invention have been described and illustrated above, it should be understood that these are exemplary examples of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An image processing apparatus which generates and outputs a plurality of processed images based on a plurality of set processing conditions from one input image input by branching a data bus output by a specific processing circuit within a pipeline comprising a plurality of processing circuits, the image processing apparatus comprising:
   a buffer having a storage capacity sufficient to store image data of the one input image;
   an input control unit configured to cause the buffer to store the image data of the one input image output from a previous-stage specific processing circuit to the data bus;
   a processing operation unit configured to perform image processing based on one processing condition among the plurality of set processing conditions on the input image and output image data of the processed image generated by the image processing;
   a plurality of output control units corresponding to each of the plurality of set processing conditions, wherein each of the output control units causes the image data necessary, when the image processing is performed in a corresponding processing condition within the image data of the one input image stored in the buffer, to be output to the processing operation unit, and causes the image data of the processed image generated by the processing operation unit based on the corresponding processing condition to be output to a corresponding subsequent-stage processing circuit; and
   an output arbitrating unit configured to determine which of the plurality of processing conditions is used to perform the image processing, and permits the output control unit corresponding to the determined processing condition to perform outputting the image data to the processing operation unit by the buffer.

2. The image processing apparatus according to claim 1, wherein the output arbitrating unit determines the processing condition in which the image processing is performed based on whether or not the image data necessary, when the image processing is performed in the processing condition, is in the buffer, on an output request of the image data of the processed image input from each of the subsequent-stage processing circuits, and on the state of each of the subsequent-stage processing circuits which receives the image data of the processed image.

3. The image processing apparatus according to claim 2, wherein the state of the subsequent-stage processing circuit that receives the image data of the processed image is a state of empty capacity of a buffer provided in the subsequent-stage processing circuit, and
wherein the output arbitrating unit determines the output control unit that permits output control in which the image data of the processed image is preferentially output to the subsequent-stage processing circuit having the buffer having a large empty capacity.

4. The image processing apparatus according to claim 3, wherein the storage capacity provided in the buffer is a storage capacity corresponding to the processing condition in which most image data is necessary in the image processing based on each processing condition set in the processing operation unit.

5. The image processing apparatus according to claim 4, further comprising:
a buffer monitoring unit configured to monitor the storage capacity provided in the buffer, notify the input control unit of information about whether there is empty capacity in the buffer, and notify each of the output control units of information about whether the image data necessary when the processing operation unit performs the image processing is complete in the buffer,
wherein, when a state in which the image data stored in the buffer is not output from any of the output control units to the processing operation unit is reached, the buffer monitoring unit determines that there is empty capacity in which the image data is able to be stored in the buffer.

6. The image processing apparatus according to claim 5, wherein the buffer monitoring unit determines whether the image data necessary when the processing operation unit performs the image processing is complete in the buffer for every processing condition corresponding to each of the output control units, and outputs information on whether the necessary image data corresponding to each of the output control units is complete to the output arbitrating unit, as information indicating whether the image data necessary when the image processing is performed in the processing condition is complete in the buffer.

7. The image processing apparatus according to claim 6, wherein, when a notification indicating that there is empty capacity in the buffer has been input from the buffer monitoring unit, the input control unit requests a previous-stage specific processing circuit to output the image data of the one input image.

* * * * *